March 30, 1926. 1,578,903
R. B. McGOWAN
FUNNEL FOR TRANSFERRING LIQUIDS
Filed Nov. 2, 1923
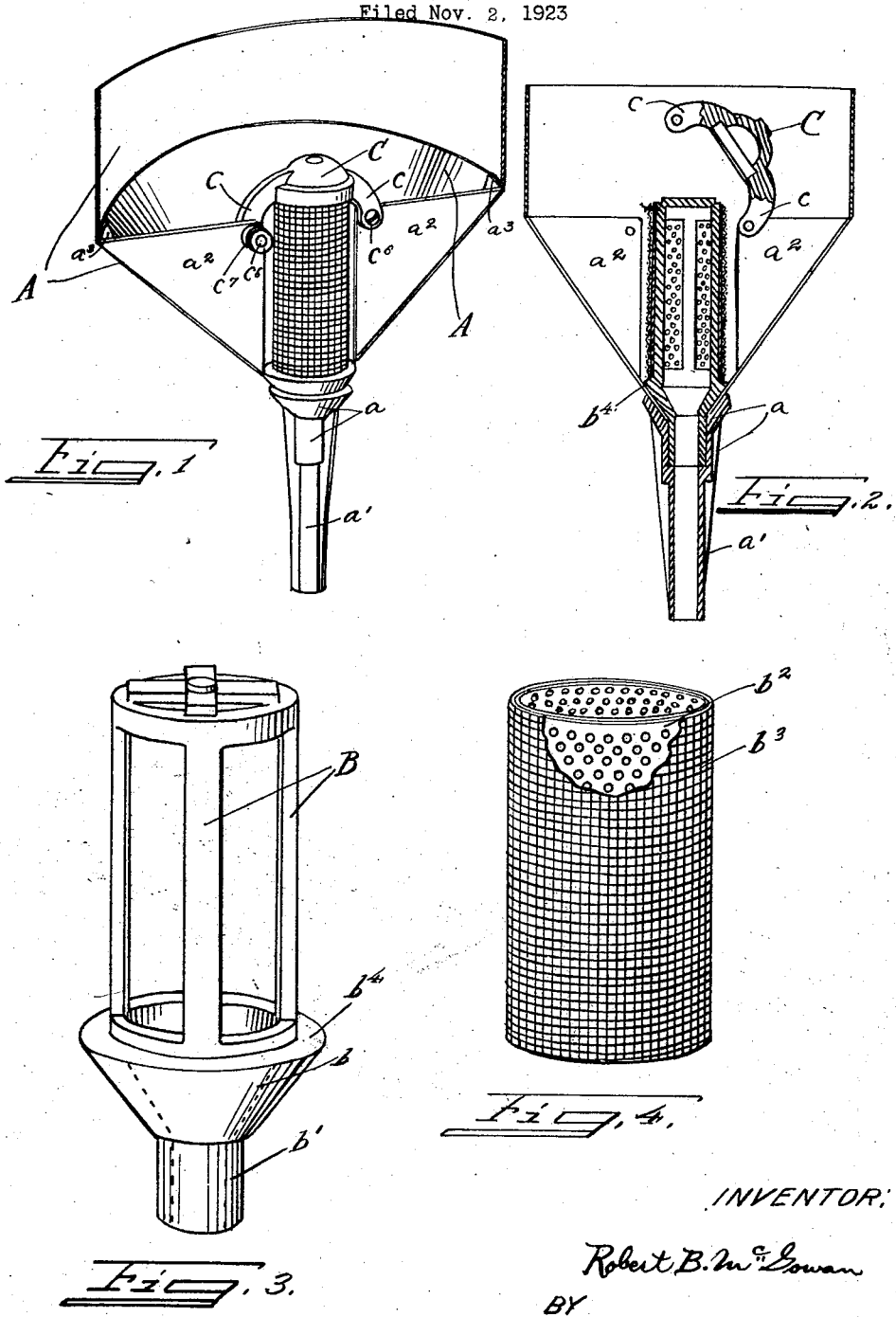

Patented Mar. 30, 1926.

1,578,903

UNITED STATES PATENT OFFICE.

ROBERT B. McGOWAN, OF CINCINNATI, OHIO, ASSIGNOR TO JOHN D. BERGER, OF CINCINNATI, OHIO.

FUNNEL FOR TRANSFERRING LIQUIDS.

Application filed November 2, 1923. Serial No. 672,258.

*To all whom it may concern:*

Be it known that ROBERT B. McGOWAN, a citizen of the United States, residing at Cincinnati, in the county of Hamilton and State of Ohio, has invented new and useful Improvements in Funnels for Transferring Liquids, of which the following is a specification.

My invention relates to funnels embodying strainers, used in the transferring of liquids from one receptacle to another, and is an improvement over the invention described in my pending patent application Ser. No. 629,268 filed April 2, 1923, in which application I describe a filtering means comprising the combination of a cage member supporting a strainer and provided with baffle plates, the whole being secured within the funnel and being readily removable therefrom as a unit.

Frequently when using funnels of this type it is desirable to change the strainer or to entirely remove it from the funnel.

The object of my present invention is to provide a funnel embodying an improved construction of the above combination, that can be rigidly secured within said funnel in such a manner that the strainer member can be readily removed or renewed without removing the cage or baffle plates from the funnel, or the cage and strainer member may be removed together from the funnel.

In the particular form of my invention selected for illustration:

Fig. 1 is a perspective of my improved funnel showing the funnel body in vertical axial section, Fig. 2 shows a vertical cross section thru the funnel and strainer supporting cage, showing the cap when being opened to a position to permit the removal of the strainer and cage, Fig. 3 is a perspective of the supporting cage member, and Fig. 4 is a perspective of the strainer members part of the outer strainer being broken away.

Referring now to the drawings, particularly Fig. 1, a liquid funnel comprising the body portion A, base $a$ and spout $a^1$, is provided with baffle plates $a^2$, secured to the inner side of the funnel body by means of the flanges $a^3$.

A strainer supporting cage B is provided with a base $b$, and elongated neck $b^1$ of such size and shape as to fit snugly within the base $a$ of the funnel.

The cylindrical strainer $b^3$ is supported upon a strainer $b^2$ of different mesh. They are adapted to seat over the cage member B and rest on the flange $b^4$ as shown in Fig. 2.

A cap C (see Fig. 1) provided with lugs $c\ c$ forms a cover for the top of the strainers $b^2\ b^3$, the lugs $c.\ c$ being secured to the baffle plates $a^2$ by means of the threaded bolts $c^6$ and nuts $c^7$ thereby holding the strainers $b^2$ and $b^3$ in position on the cage B, and the cage B in position within the funnel.

It will be seen by Fig. 2 that the cap C is secured to the baffle plates $a^2$, $a^2$ in such a manner that when it is desired to remove the strainers $b^2\ b^3$, or the strainers $b^2\ b^3$ together with the cage B from the funnel, the threaded bolt $c^6$ and nut $c^7$ is removed from one of the lugs $c$ and the cap is swung open on the other of said lugs thereby enabling said strainer members with or without the cage to be removed from the funnel, whereupon the cap C can be again bolted into position and will operate as a strengthening member for the baffle plates $a^2\ a^2$. Obviously the strainers $b^2$ and $b^3$ could be placed within the cage B.

I do not wish to be limited to the exact construction as shown but conceive as within the scope of my invention all forms readable on the claims.

I claim as my invention and desire to secure by Letters Patent of the United States:

1. In a funnel for transferring liquids, a plurality of baffle plates integral with said funnel, a removable strainer within said funnel and means secured to said baffle plates for holding said strainer in operative position.

2. In a funnel for transferring liquids, a plurality of baffle plates integral with said funnel, a removable strainer within said funnel and a cap for said strainer secured to said baffle plates for holding said strainer in position.

3. In a funnel for transferring liquids, a plurality of baffle plates integral with said funnel, a removable strainer within said funnel, a cap for said strainer loosely swung on one of said baffle plates and adapted to permit the ready removal of said strainer and means for securing said cap to the other of said baffles.

4. In a funnel for transferring liquids the combination with said funnel of a plurality of baffle plates integral with said funnel, a strainer supporting cage within said funnel, a strainer seated upon said cage, a cap for said strainer loosely swinging on one of said baffle plates and adapted to permit the ready removal of said strainer and means for securing said cap to the other of said baffle plates.

In testimony whereof I have hereunto set my hand.

ROBERT B. McGOWAN.